(12) United States Patent
Klaghofer et al.

(10) Patent No.: US 7,227,922 B2
(45) Date of Patent: Jun. 5, 2007

(54) METHOD AND DEVICE FOR THE TRANSMISSION OF DATA IN A PACKET-ORIENTED DATA NETWORK

(75) Inventors: Karl Klaghofer, München (DE);
Harald Müller, Gilching (DE);
Heribert Müller, Eggenburg (AT);
Jürgen Totzke, Poing (DE)

(73) Assignee: Siemens Aktiengesellschaft, Munich (DE)

( * ) Notice: Subject to any disclaimer, the term of this patent is extended or adjusted under 35 U.S.C. 154(b) by 751 days.

(21) Appl. No.: 10/237,188

(22) Filed: Sep. 9, 2002

(65) Prior Publication Data
US 2003/0048855 A1 Mar. 13, 2003

(30) Foreign Application Priority Data
Sep. 7, 2001 (DE) ................................ 101 44 010

(51) Int. Cl.
*H04L 23/00* (2006.01)
*H04J 3/22* (2006.01)

(52) U.S. Cl. ...................................... 375/377; 370/467
(58) Field of Classification Search ............. 379/88.13; 370/356, 296, 401, 464–467, 241, 252, 254, 370/477; 375/377
See application file for complete search history.

(56) References Cited

U.S. PATENT DOCUMENTS

| | | | | |
|---|---|---|---|---|
| 5,517,652 | A * | 5/1996 | Miyamoto et al. | 725/115 |
| 6,259,701 | B1 * | 7/2001 | Shur et al. | 370/401 |
| 6,691,149 | B1 * | 2/2004 | Yokota et al. | 709/201 |
| 6,768,722 | B1 * | 7/2004 | Katseff et al. | 370/260 |
| 6,920,124 | B1 * | 7/2005 | Lappe et al. | 370/337 |
| 6,965,682 | B1 * | 11/2005 | Davis et al. | 382/100 |
| 2002/0082922 | A1 * | 6/2002 | Van Zoest et al. | 705/14 |
| 2003/0009657 | A1 * | 1/2003 | French et al. | 713/2 |
| 2005/0058319 | A1 * | 3/2005 | Rhoads et al. | 382/100 |

FOREIGN PATENT DOCUMENTS

| GB | 2 323 246 | 9/1998 |
|---|---|---|
| WO | WO99/18728 | 4/1999 |

OTHER PUBLICATIONS

M C Bale, "Voice and Internet multimedia in UMTS networks", Jan. 2001, pp. 48-66 vol. 19 No. 1 BT Technology Journal, BT Laboratories, GB.
T. Warabino et al., Video Transcoding Proxy for 3Gwireless Mobile Internet Access, Oct. 2000, IEEE Communications Magazine, pp. 66-71.
T. Taylor, "Megaco/H.248: A New Standard for Media Gateway Control", IEEE Communications Magazine Oct. 2000, pp. 124-132.
David J. Y. Lee et al., "Integrating Global Wireless Systems with IP", IEEE Communications Magazine, Oct. 2000, pp. 232-236.

* cited by examiner

*Primary Examiner*—Tesfaldet Bocure
(74) *Attorney, Agent, or Firm*—Staas & Halsey LLP (57) ABSTRACT

Method of transmission of data between at least two communication devices which are connected together over a data network. The communication devices are respectively connected to a coding device and the sent data are source-and channel-coded by a coding method respectively furnished within the coding devices. The data are converted within a converting device connected to the data network.

13 Claims, 5 Drawing Sheets

METHOD AND DEVICE FOR THE TRANSMISSION OF DATA IN A PACKET-ORIENTED DATA NETWORK

CROSS REFERENCE TO RELATED APPLICATIONS

This application is based on and hereby claims priority to German Application No. 101 440 10.3 filed on Sep. 7, 2001, the contents of which are hereby incorporated by reference.

BACKGROUND OF THE INVENTION

The invention relates to a method of packet-oriented transmission of data between at least two communication devices, and also a control device and a conversion device.

Communication connections for speech have heretofore predominantly been constructed as connection-oriented. A physical connection is exclusively provided for this purpose, for a signal transmission between two communication end points, and is reserved for the whole time of the connection. This is also termed line-oriented transmission, static routing, or circuit switching.

With the advent of packet-oriented data networks (packet switching), such as for example the Internet, communication is offered in the fixed-network range which provides cost reduction in comparison with connection-oriented telecommunication. This is in particular to be ascribed to the efficient capacity utilization of a connection, since in contrast to circuit-switching, packet-switching does not occupy the physical transmission medium for the whole duration of the connection. The data to be transported is divided into individual data packets, each data packet receiving an address code which identifies the receiver of the transmission. The individual data packets are then transmitted independently of each other—and they can even use different transmission paths. The principle of packet switching is defined in various standards; the best-known standard is described in ITU-T Recommendation x.25.

VoFR (Voice over Frame Relay) or VoIp (Voice over IP) are for example known as packet-oriented transmission methods. Here the speech data are digitized, undergo a source coding and preferably a channel coding, and are divided into data packets, which are then transmitted over the Internet. VoIp in particular is predicted to be of considerable importance for future speech communication. Here the speech is digitized and compressed (source coded) using software or hardware, the compressed speech then representing the use data region of the IP packets. Selected call numbers are converted into IP addresses and placed in the IP header as target information. The IP packets are now transported over plural network nodes distributed in the data network, as far as the distant end of the speech connection. The distant end memorizes the incoming packets and combines then again in the correct sequence. If a packet is damaged or lost, it is not sent anew. The speech information is taken out of the packets at the distant end and is then supplied to a coding device in which the information is then inversely source- and channel-coded and is then made audible by suitable hardware.

Since a delayed arrival of adjacent IP speech packets (delay) has a negative effect on the quality of the speech connection, various methods of time synchronizing, and thus minimizing the delay, are provided in the IP network in order to maintain the QoS (Quality of Service). The insertion of a Real Time Protocol (RTP) belongs to this method, in which each IP packet, etc., additionally receives a time stamp with the time of origin and a sequence number (sequence information). This permits the receiving device to combine packets not only in the correct sequence, but also time-synchronized. The RTP furthermore defines the coding of audio signals according to G.723, G.711 or G.729. Concerned here are encoding and decoding methods (codecs), which are defined by the ITU for analog and digital encryption of speech in telephone networks.

G.711 about corresponds to the ISDN standard, in which speech data are transmitted with a data stream of 64 kBit/s. By additional source coding, the data rate can be reduced as far as 9.6 kBit/s, making transmission over VoIp networks possible for the first time.

The widespread CELP method (Codebook Excited Linear Predictive Coding) method counts as one of these methods; it processes human speech with a complicated mathematical model. The output of this source coding is a data stream with a data rate of 16 kBit/s, and the speech quality almost corresponds to ISDN speech quality. Combined with a Dual Rate Speech Coding defined in the G.723 standard, even a data stream with a data rate of only 5.3 kBit/s is sufficient, with a reduced but subjectively accepted speech quality. Besides a lower network loading, this brings the further advantage that plural IP packets are buffered without endangering the real time condition. The quality of the speech transmission on the Internet thus rises with a falling data rate for a speech channel.

Voice over IP likewise includes protocols for the transmission of different multimedia formats, which go beyond pure speech data. In particular, the possibility of transmitting video conferences falls within this expansion.

The MPEG-1 standard counts as the best known codec for source coding video signals. Here the resolution of the coded picture is limited to a Source Input Format (SIF), in which the chrominance is under-sampled in both directions, and the number of pixels is halved. The video data is reduced by motion estimation and redundancy reduction such that transmission over the Internet is made possible.

The H.261 standard, adopted by the CCITT in 1990, represents a widely diffused standard for source coding of video material. This compression standard was developed for videoconferencing and other video services in ISDN at bit rates of multiples of 64 kBit/s. The improved and extended standard H.263 was developed later, and was specified for bit rates smaller than 64 kBit/s.

Thus there are many characteristic codecs for each data category (audio or video). For communication, of course, all potential communication partners must have a command of the respective codec with which information was coded, in order to be able to perform subsequent decoding. For example, if a speech message is encoded with the audio codec G.729 and transmitted to a receiving device which cannot decode this codec, the call setup will be broken off.

With increasing propagation of different VoIp networks and application scenarios, special equipments more and more frequently come to be used, which only have a command of special coding methods. In such network configurations, an increasing number of coding methods has to be implemented for numerous standard end equipments, entailing higher computing power and higher license costs.

One potential object of the invention therefore is to develop a process of this category to the effect that a call can be set up, even with differently furnished coding and decoding methods. A further potential object of the invention is to make available a control device and a converting device for performing the method.

SUMMARY OF THE INVENTION

By "multimedia data" there is understood speech data and/or picture or moving picture and video data.

An important concept relates to mutually incompatible coding and decoding methods of a transmitting device and a receiving device, the multimedia data to be transmitted is transmitted from the first communication device to a converting device provided in the data network, is converted within the converting device, and the converted multimedia data is transmitted to the transmitting and receiving device of the second communication device.

An advantage of this method has as its basis that a connection setup can be effected even with mutually incompatible coding and decoding methods of the end equipments. Thus markedly fewer coding processes are integrated into the end equipments, so that the computing power within the equipments for performing the coding can be reduced. Moreover costs for licenses of the software or hardware required for effecting the coding are reduced.

In a preferred embodiment, a connection setup which cannot be executed because of incompatible coding and decoding methods is identified by a monitoring device arranged within a control device. Consequently, a first identification is sent to a signaling device likewise arranged within the control device. The signaling device thereupon sends a signal to the second communication device, by which a polling of the decoding process arranged within the decoding device of the second communication device is initiated. Following on this polling, a second identification, which is dependent on the decoding process furnished within the decoding device, is transmitted to the control device and then sent to the converting device. The coding method of the first communication device is identified within the control device, and a corresponding third identification is sent to the converting device. The multimedia data is then converted within the converting device in dependence on the second and third identification.

In a further embodiment, a connection setup which cannot be executed due to incompatible coding and decoding methods is identified by a monitoring device arranged within the converting device. Consequently a first identification is sent to a signaling device likewise arranged within the converting device. Upon this, the signaling device sends to the second communication device a signal by which a polling of the decoding method arranged within the decoding device of the second communication device is initiated. In connection with this polling, a second identification, depending on the decoding method furnished within the decoding device, is transmitted to the converting device by the second communication device. Within the converting device, the coding method of the first communication device is identified as a third identification. The multimedia data is then also here converted within the converting device in dependence on the second and third identification.

The multimedia data to be converted is preferably supplied to a third decoding device which is arranged within the converting device and which carries out a decoding of the coded multimedia data corresponding to the second identification. The decoded multimedia data is then supplied to a third coding unit which is likewise arranged within the converting unit and which performs a coding of the multimedia data corresponding to the third identification. In connection with the conversion, the coded data is transmitted to the transmitting and receiving device of the second communication device.

The converting device, in a software embodiment, keeps memorized within a database numerous algorithms for carrying out decoding and coding methods. A processor, connected to the database via an interface, performs both a decoding and a coding of the data, corresponding to the second and third identifications received by the control unit.

In a hardware-based embodiment, the multimedia data is supplied to a semiconductor element, in particular a digital signal processor (DSP), arranged within the converting device. The data is then converted within the DSP in dependence on the second and third identification.

In a preferred embodiment, the data network is constructed as a communication system according to the H.323 standard for the transmission of VoIp data, and the control device is preferably constructed as a H.323 gatekeeper. In a further embodiment, the data network is constructed as a multimedia communication system according to a SIP standard, the control device then preferably being constructed as a SIP proxy. The converting device is preferably controlled by the control device by the H.248 protocol or the Megaco protocol (MGCP).

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

Figure 1:
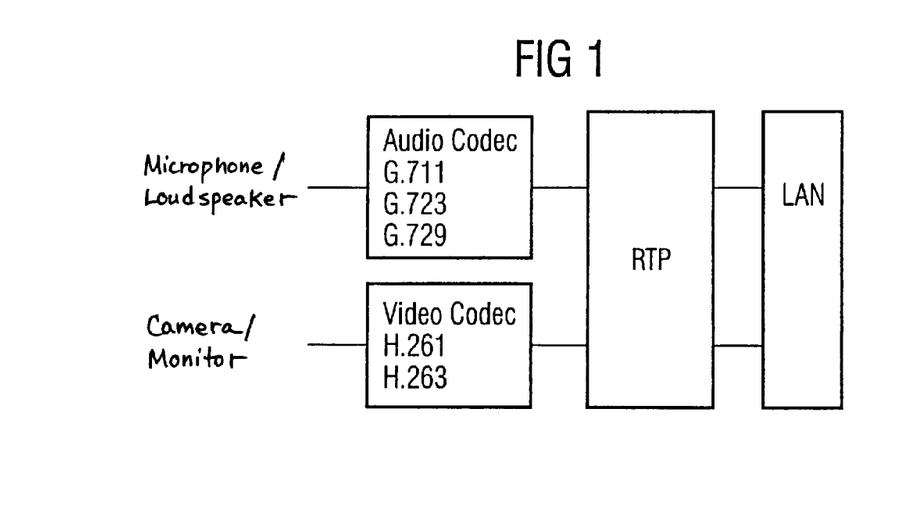
FIG. 1 shows a structure of a communication system according to the H.323 standard.

In FIG. 1, a system structure according to the H.323 standard is shown. The H.323 standard sets out the standard for real time communication, and describes the transport of multimedia data via IP-based networks which have no guaranteed "Quality of Service" (QoS). A real time protocol (RTP) defines the coding of audio signals and video signals. For each of these data categories, there are their own codecs, which are likewise standardized. Which codec is used in a communication depends on the resources present (computer power, transmission bandwidth) and on the desired quality, and is established during the connection setup.

For the transmission of audio data, the codecs G.711, G.723 or G.729 form part of the system for source coding. In particular, the standard G.723 is of great importance for VoIp transmission, since a data stream with a data rate of 5.3 kBit/s and with good speech quality is available at the output of a source coding according to this standard. For the transmission of moving image material over VoIp networks, the video data is compressed by the H.261 or H.263 codecs.

In particular, the H.263 standard is of great importance here, since this codec compresses the video data to a data rate smaller than 64 kit/s.

Figure 2:
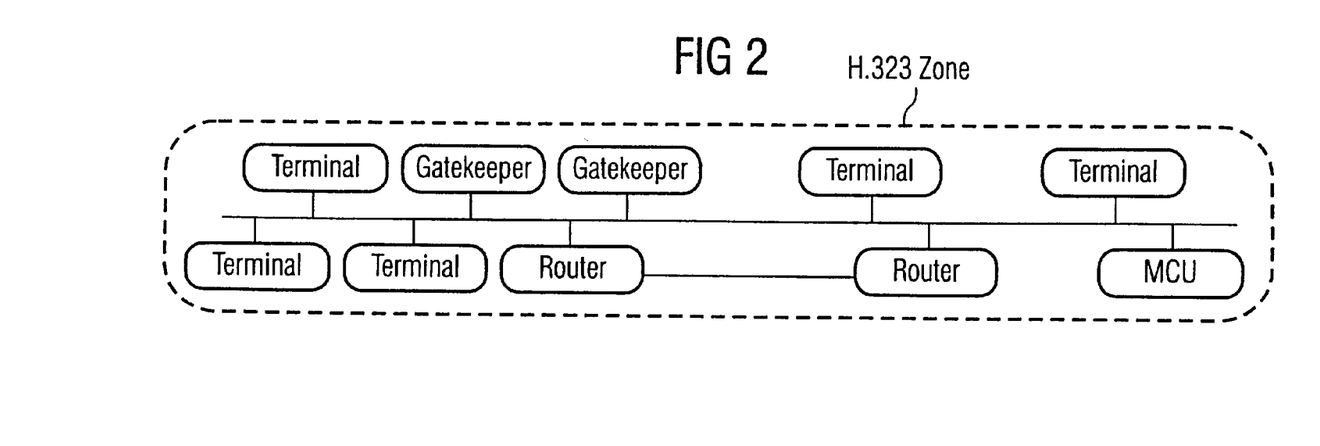
FIG. 2 shows a structure of a H.323 network.

FIG. 2 shows the structure of an H.323 network. There are plural different components in an H.323 network: terminals, gateways, gatekeeper and multipoint control units (MCU). In the H.323 recommendation, terminals represent the end points of a bidirectional real time communication. H.323 establishes the different kinds of operation by which the terminals can exchange information between them. Audio/video data and control signals count as items of information which are exchanged between H.323 terminals. Each of these data categories has its own codec, which is likewise standardized.

In the gateways, there take place the transition from one transmission network into another, and the therewith connected conversion between different transmission formats. Gateways are principally used for the linking of the open telephone network to the Internet.

A gatekeeper has the task of testing the access rights of the user during call setup, carrying out address conversions, and managing the bandwidth available for communication. The totality of all terminals, gateways and multipoint control unite which a gatekeeper manages is termed an H.323 zone.

A multipoint control unit is required for conference circuits between three or more H.323 terminals or gateways. A MCU has a multipoint controller (MC) and an arbitrary number of multipoint processors (MP).

Figure 3:
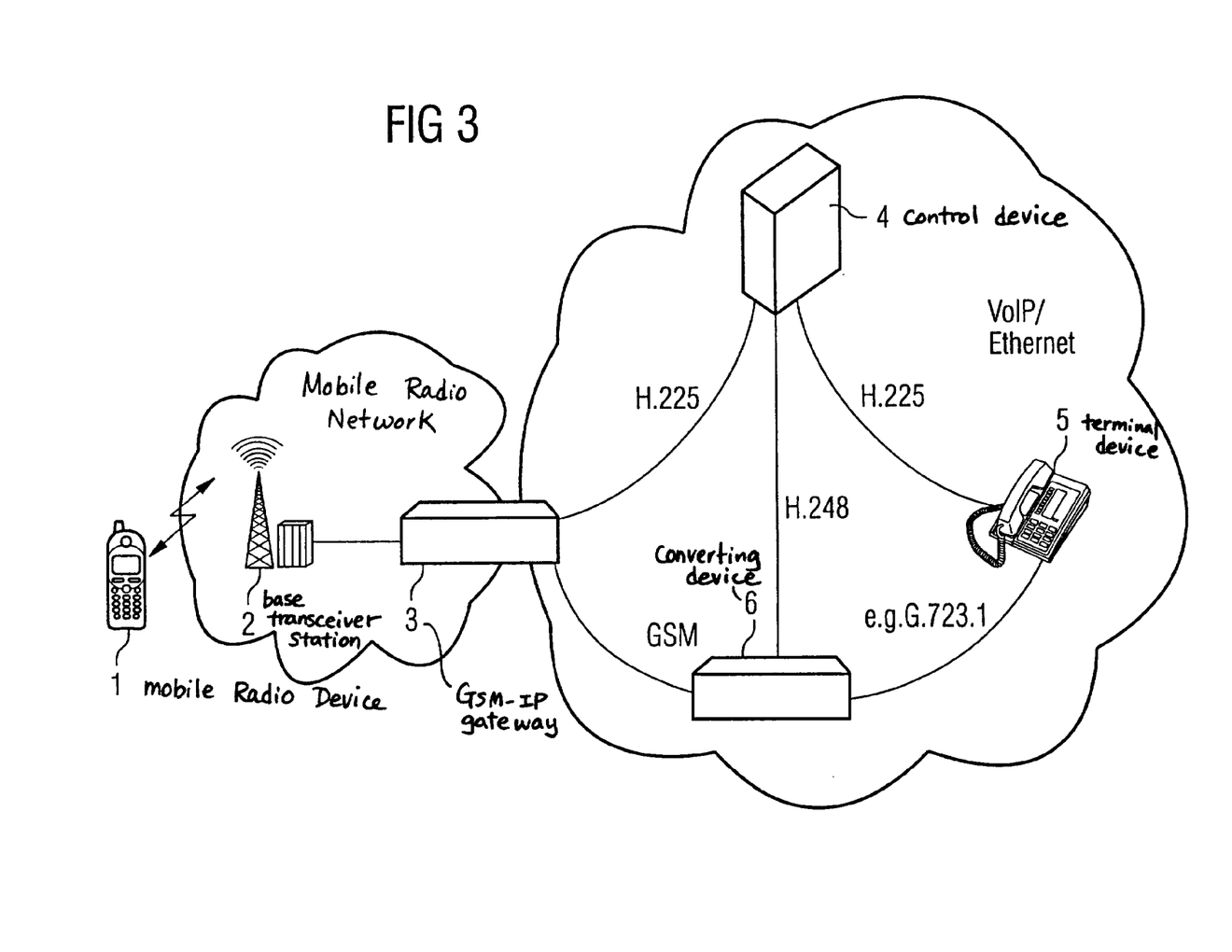
FIG. 3 shows an example of a network structure in an embodiment of the invention.

FIG. 3 shows an example of a network structure in an embodiment of the invention. In this example, a mobile subscriber of a mobile radio network—here a GSM network—would like to set up a connection to an IP network by a GSM-IP gateway. For this purpose, the mobile subscriber produces with a mobile radio device 1 a connection to a base transceiver station (BTS) 2 via an air interface. The connection is passed on from the mobile radio network via the GSM-IP gateway 3 to the IP network.

The IP network is constructed as an H.323/H.248-controlled VoIp network in this embodiment. The GSM-IP gateway 3 converts the GSM-coded speech signal into IP packets. It follows from this that the speech signals are coded by the GSM coding method on the VoIp network also.

The embodiment example is furthermore based on the assumption that all calls of all subscribers are signaled by a control device 4, for example, a H.323 gatekeeper. A terminal device 5 connected to the VoIp network has only the coding method G.723 integrated into it. Thus in relation to the state of the art, no speech channels can be set up between the mobile radio device 1 and the terminal device 5.

According to an embodiment of the invention, a converting device 6 is integrated within the VoIp network. This device contains a monitoring device which detects an occurrence of a connection setup rejected due to incompatible codecs. Consequently, signals are triggered for polling the codec used by the mobile radio device and the terminal device. The converting device 6 keeps numerous codecs memorized, by which the coded data of the mobile radio device 1 is decoded, then re-encoded according to the codec of the terminal device 5, and finally transmitted to the terminal device 5.

This method is of course also performed in reverse, so that the data of the terminal device 5, encoded according to G.723, is decoded and then re-encoded according to the GSM standard and transmitted to the GSM-IP gateway 3 and then to the mobile radio terminal device 1. The standard H.248 is used as a generic control protocol between the converting device 6 and the H.323 gatekeeper 4.

Figure 4:
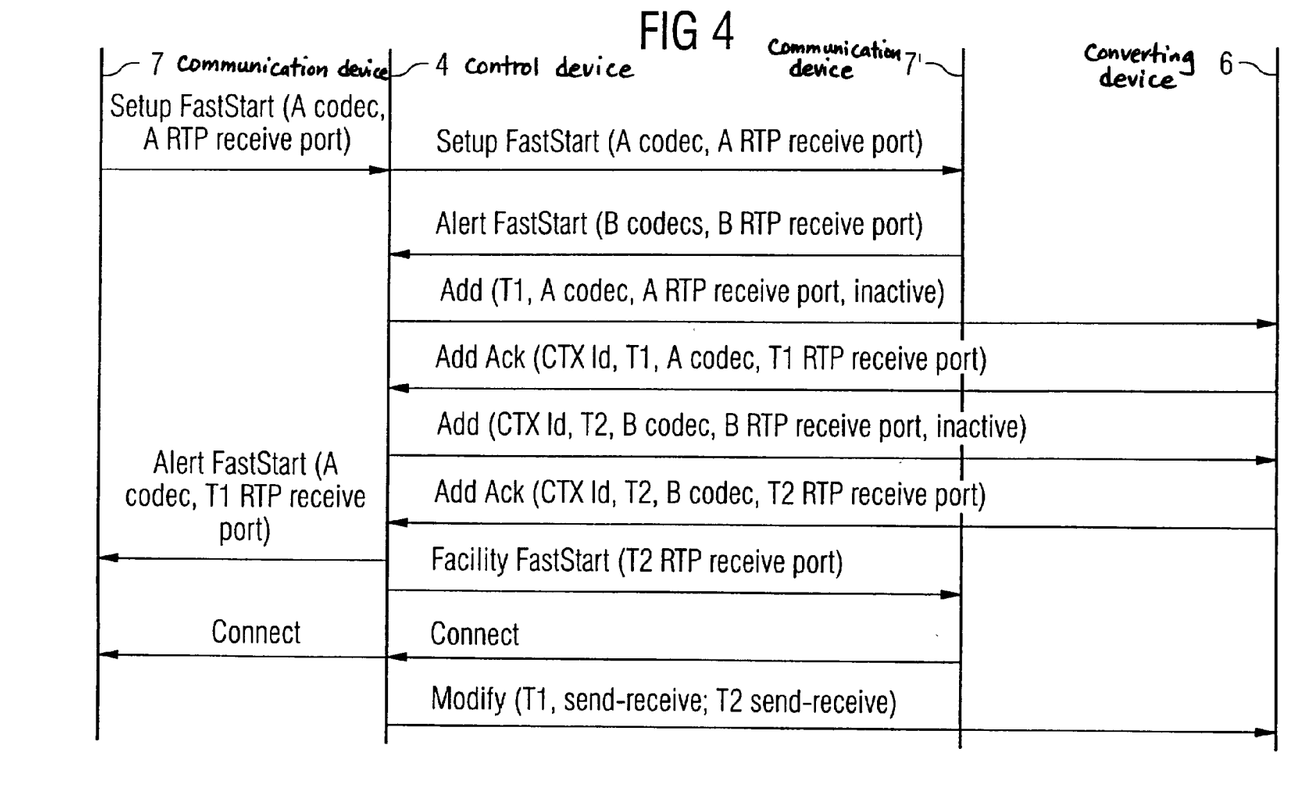
FIG. 4 shows an example of the course of signaling, by a flow diagram.

FIG. 4 shows in a flow diagram an example of the course of signaling between two communication devices 7,7'. A subscriber A of the mobile radio network builds with the GSM-IP gateway a call in the VoIp network to the terminal device 5 of a subscriber B. Since the GSM-IP gateway 3 can only send out GSM-coded speech data at the gateway, only this format is also given to the H.323 gatekeeper 4 in an H.225.0 SETUP message. This notes the available speech format and forwards the SETUP message to the subscriber B. Subscriber B replies with a H225.0 ALERT message giving the implemented speech format, e.g., G.723.

The gatekeeper 4 now recognizes the lack of a common speech format and now in its turn starts the construction of the corresponding speech channels in the converting device 6 by H.248 messages. After this has taken place, the ALERT message relating to the reception address of the speech data of subscriber A is modified and is passed on to the calling subscriber A. The GSM-IP gateway 3 is thereby caused to send its use data, not to the terminal device 5 but to the converting device 6. Furthermore, to which port number the converting device 6 must send the speech data of subscriber B is already known at this point in time. This is signaled, for example, to the terminal device 5 by a H.225 facility message. The terminal device 5 is thereby caused to send its use data, not to the GSM-IP gateway 3 but to the converting device 6.

As soon as the subscriber B, in the further course of events, completes the call setup by an H.225 CONNECT message to the gatekeeper 4, on the one hand this is passed on to the GSM-IP gateway 3. On the other hand, the gatekeeper 4 switches the speech channels in the converting device 6 active, so that now the speech data relating to the speech formats are converted in the converting device 6 for this call.

Figure 5A:
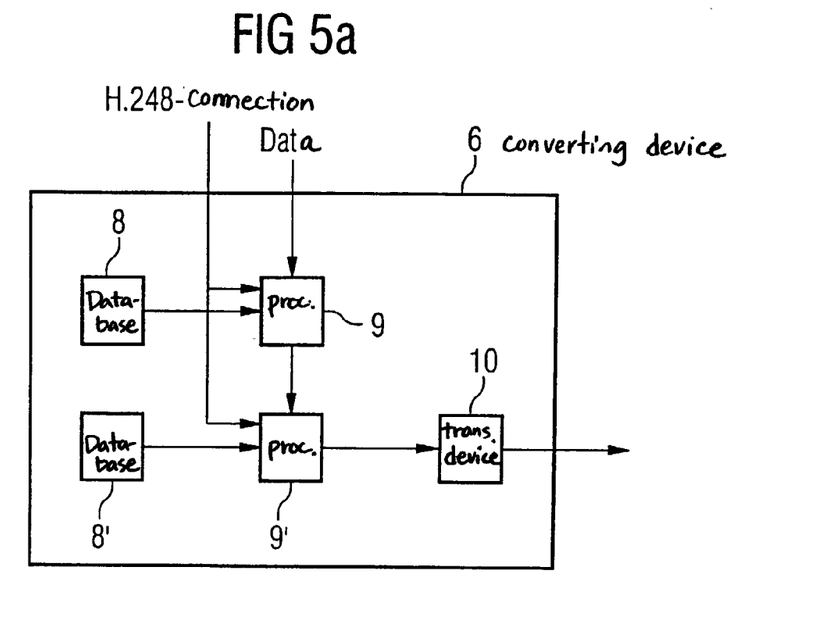
FIG. 5 shows an example of a converting device.

FIG. 5a shows the example of a converting device 6 according to an embodiment of the invention. Two databases 8, 8' are arranged within the converting device 6. The first database 8 keeps numerous algorithms memorized for decoding data, and the second database 8' keeps numerous algorithms memorized for coding data. The data to be converted is supplied to a first processor 9. A H.248 connection is set up between the processor 9 and the control device 4, and the second identification relating to the codec of the supplied data is transported over it. An algorithm corresponding to this identification for decoding this data is loaded from the first database 8, and decoding is then carried out.

The decoded data is consequently supplied to a second processor 9', which likewise has a H.248 connection to the control device 4 over which the third identification relating to the codec of the called terminal device 5 is transported. Corresponding to this identification, the codec required for coding is loaded from the second database 8' and a coding is carried out. The coded data is supplied to a transmitting device 10 which then transmits this data to the respective terminal device.

Figure 5B:
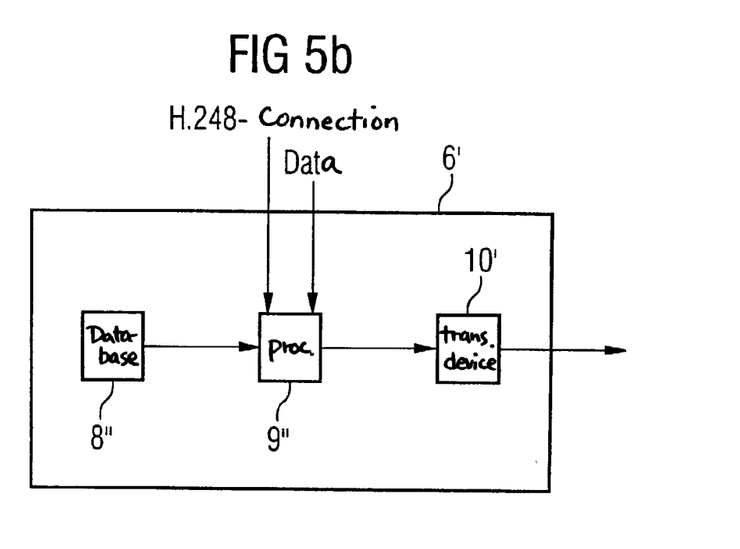

FIG. 5b shows, in an exemplary embodiment of the invention, a further structure of a converting device 6'. In contrast to the embodiment shown in FIG. 5a, only a processor 9" and a database 8" for carrying out the process are arranged within the device. The database 8" contains algorithms for decoding and likewise for coding data. A suitable codec is loaded from the database 8" corresponding to the identifications transferred over the H.248 line, and by it the data supplied to the processor 9" is decoded in the processor corresponding to the second identification and is likewise coded corresponding to the third identification. The coded data is supplied to a transmitting device 10' which then transfers these data to the respective terminal device.

Figure 6:
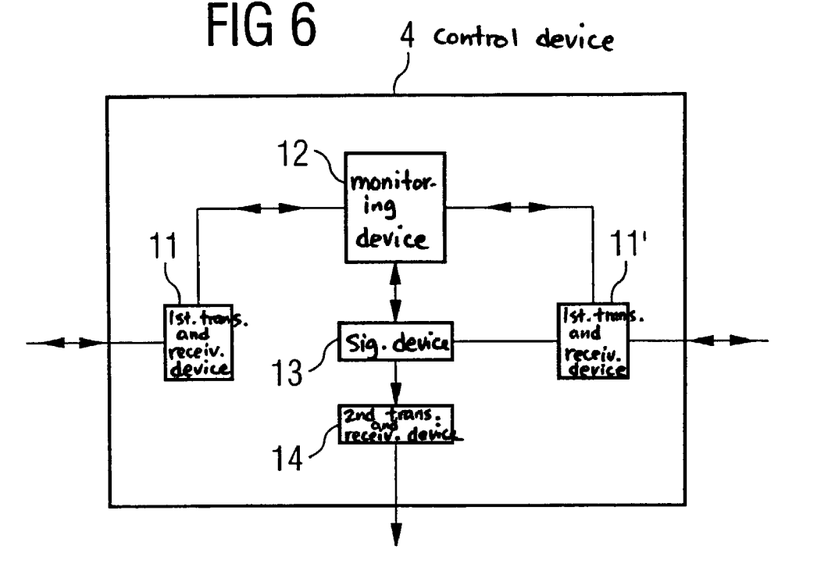
FIG. 6 shows an example of a control device.

FIG. 6 shows, in an exemplary embodiment of the invention, a structure of a control device 4. Signaling data for the setting up of a connection between two terminal devices is supplied to the device by first and second H.225 transmitting and receiving devices 11,11'. The data are supplied to a monitoring device 12 which is arranged within the device 4 and which registers a call setup rejected due to incompatible coding and decoding methods and transmits a first identification thereof to a signaling device 13.

The signaling device sends a signal by the second transmitting and receiving device 14, to poll the decoding method arranged within the second terminal device. In dependence on a corresponding return signal of the second terminal device, a second identification is characterized in dependence on the decoding method arranged within the second terminal device. In dependence on a signal of the first terminal device received at the signaling setup, a third identification is characterized in dependence on the coding method arranged within the first terminal device. The second and third identifications are transmitted to the converting device via an H.248 transmitting and receiving device 15.

Figure 7:
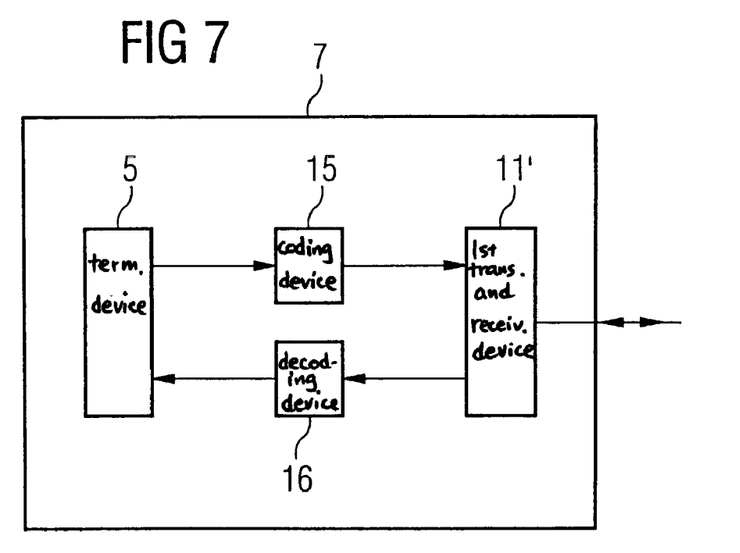
FIG. 7 shows an example of a communication device.

FIG. 7 shows a communication device 7, having a terminal device 5 which is connected via lines to a coding device 16 and a decoding device 17. The devices are respectively connected to a H.225 transmitting and receiving device 11", which passes on the incoming data to the decoding device 17. In an embodiment not shown in the Figure, the decoding device 17, the coding device 16, and the H.225 transmitting and receiving device 11" are integrated within the terminal device 5. A VoIp-configured personal computer can likewise be used instead of a terminal device.

The invention has been described in detail with particular reference to preferred embodiments thereof and examples, but it will be understood that variations and modifications can be effected within the spirit and scope of the invention.

What is claimed is:

1. A method for the transmission of multimedia data between at least two communication devices which are connected together over a data network, each of the communication devices having an associated coding device and an associated decoding device connected thereto, comprising:

performing source- and channel-coding on multimedia data to be sent, using a coding method furnished within the coding device associated with a first communication device, which sends the multimedia data;

performing inverse source- and channel-coding on multimedia data received, using a decoding method furnished within the decoding device associated with a second communications device, which receives the multimedia data;

transmitting and receiving coded multimedia data using an associated transmitting and receiving device arranged between the data network and the coding and decoding devices;

when there is a connection setup which cannot be implemented due to incompatible coding and decoding methods:

transmitting the multimedia data from the transmitting and receiving device associated with the first communication device to a converting device provided in the data network, converting the multimedia data within the converting device to thereby form converted multimedia data, and transmitting the converted multimedia data to the transmitting and receiving device associated with the second communication device;

identifying a connection setup which cannot be implemented due to incompatible coding and decoding methods, using a monitoring device arranged within a control device;

sending a first identification from the monitoring device to a signaling device arranged within the control device, the first identification indicating incompatibility;

sending a signal for polling the decoding method furnished within the decoding device associated with the second communication device, the signal being sent by the signaling device;

transmitting a second identification from the second communication device to the control device in dependence on the decoding method furnished within the decoding device associated with the second communication device;

sending a third identification from the control device, the coding method of the first communication device being identified with the third identification, the third identification being sent to the converting device; and converting the multimedia data within the converting device in dependence on the second and third identifications.

2. A method according to claim 1, wherein the multimedia data to be converted is supplied to a decoding device which is arranged within the converting device and which performs a decoding of the coded multimedia data according to the second identification;

the decoded data is supplied to a coding device which is arranged within the converting device and which performs a coding of the multimedia data according to the third identification; and the coded multimedia data is transmitted to the transmitting and receiving device associated with the second communication device.

3. A method according to claim 2, wherein the conversion within the coding and decoding devices in the converting device is performed by an algorithm executed on a digital signal processor.

4. A method according to claim 1, wherein the data network is a communication system according to the H.323 standard for the transmission of voice over IP data, and the control device is an H.323 gatekeeper.

5. A method according to claim 1, wherein the data network is a multimedia communication system, and the control device is an SIP proxy.

6. A method according to claim 1, wherein the converting device is controlled by the control device by the H.248/MEGACO protocol or the MGCP protocol.

7. The method according to claim 1, wherein the second identification is sent from the second communication device to the control device, the control device forwarding the second identification to the converting device.

8. The method according to claim 1, wherein the control device is part of the first communication device.

9. A method for the transmission of multimedia data between at least two communication devices which are connected together over a data network, each of the communication devices having an associated coding device and an associated decoding device connected thereto, comprising:

performing source-and channel-coding on multimedia data to be sent, using a coding method furnished within the coding device associated with a first communication device, which sends the multimedia data;

performing inverse source-and channel-coding on multimedia data received, using a decoding method furnished within the decoding device associated with a second communications device, which receives the multimedia data;

transmitting and receiving coded multimedia data using an associated transmitting and receiving device arranged between the data network and the coding and decoding devices;

when there is a connection setup which cannot be implemented due to incompatible coding and decoding methods:

transmitting the multimedia data from the transmitting and receiving device associated with the first communication device to a converting device provided in the data network, converting the multimedia data within the converting device to thereby form converted multimedia data, and transmitting the converted multimedia data to the transmitting and receiving device associated with the second communication device;

identifying a connection setup which cannot be implemented due to incompatible coding and decoding methods, using a monitoring device arranged within the converting device;

sending a first identification from the monitoring device to a signaling device arranged within the converting device, the first identification indicating incompatibility;

sending a signal for polling the decoding method furnished within the decoding device associated with the second communication device, the signal being sent by the signaling device;

sending a second identification to the converting device from the second communication device in dependence on the decoding method furnished within the decoding device associated with the second communication device;

characterizing the coding method of the first communication device within the converting device using a third identification; and converting the multimedia data within the converting device in dependence on the second and third identifications.

10. A method according to claim 9, wherein the multimedia data to be converted is supplied to a decoding device which is arranged within the converting device and which performs a decoding of the coded multimedia data according to the second identification;

the decoded data is supplied to a coding device which is arranged within the converting device and which performs a coding of the multimedia data according to the third identification; and the coded multimedia data is transmitted to the transmitting and receiving device associated with the second communication device.

11. A method according to claim 10, wherein the conversion within the coding and decoding devices in the converting device is performed by an algorithm executed on a digital signal processor.

12. A control device to control conversion of multimedia data in a system having first and second communication devices operating using different coding and decoding methods for the multimedia data, comprising:

a monitoring device to identify a direct connection setup rejected due to incompatible coding and decoding methods for the multimedia data, the direct connection being between the first and second communication devices without an intervening converting device, a signaling device to signal for a polling of the multimedia decoding method of the second communication device, and a transmitting and receiving device to transmit an identification in dependence on the multimedia coding method of the first communication device and the decoding method of the second communication device, the identification being sent to a converting device so that the multimedia data can be routed through and converted in the converting device.

13. A converting device to convert multimedia data in a system having first and second communication devices operating using different coding and decoding methods, comprising:

a database containing plural algorithms for decoding/coding multimedia data;

a receiving device to receive coded multimedia data from the first communication device, to receive a coding identifier from the first communication device that identifies the coding method used by the first communication device and to receive a decoding identifier from the second communication device that identifies the decoding method used by the second communication device;

a processor to decode the multimedia data according to the coding method specified by the coding identifier and to code the multimedia data according to the decoding method specified by the decoding identifier, the database containing algorithms for the decoding method and the coding method; and a transmitting device to transmit the multimedia data after coding, to the second communication device.

* * * * *